United States Patent [19]

Denlinger

[11] Patent Number: 4,782,328

[45] Date of Patent: Nov. 1, 1988

[54] AMBIENT-LIGHT-RESPONSIVE TOUCH SCREEN DATA INPUT METHOD AND SYSTEM

[75] Inventor: Michael B. Denlinger, Haworth, N.J.

[73] Assignee: Product Development Services, Incorporated, Fairfield, Conn.

[21] Appl. No.: 914,484

[22] Filed: Oct. 2, 1986

[51] Int. Cl.[4] ............................................. G01S 5/16
[52] U.S. Cl. ........................... 340/365 P; 250/221; 340/712
[58] Field of Search ........................... 340/712, 365 P; 178/17 D, 18; 250/221, 214 AL, 549

[56] References Cited

U.S. PATENT DOCUMENTS

| | | | |
|---|---|---|---|
| 4,185,192 | 1/1980 | Wagner | 250/221 |
| 4,507,557 | 3/1985 | Tsikos | 340/712 |
| 4,550,250 | 10/1985 | Mueller et al. | 340/710 |

Primary Examiner—John W. Caldwell, Sr.
Assistant Examiner—Alvin Oberley
Attorney, Agent, or Firm—Parmelee, Bollinger & Bramblett

[57] ABSTRACT

A convenient predetermined rectangular passive area is converted into a touch screen suitable for feeding X and Y cartesian coordinate data into a computer by employing ambient light as the medium to sense positioning of a pointer brought near to any desired coordinate location of the touch screen. Such "pointer" can be a stylus, rod, dowel, finger, pencil, or similar relatively long, slim element readily movable by hand and capable of reflecting a significant proportion of incident ambient light or of creating sharp shadows. The passive area can be any selected rectangular area of suitable size in space or in the air, or on or near an inert panel of plywood, hardboard, sheetrock, or flat wall, etc., or in a region located before a video or tracking screen, selection chart or informational items, for example, a passive custom keyboard. When the pointer comes near this touch screen, respective rays of its reflected or shadowed ambient light enter at least two optical sensing units mounted proximate to (but outside of) at least two adjacent corners of the touch screen. Each unit concentrates a field of vision spanning the screen area, with limited height, onto a line array of photosensors to interpret the angles A and B of detected changes in light intensity levels. X and Y are then determined by intersection of angles A and B using trigonometric procedures. The rugged touch screen method and system advantageously work over wide ranges of sizes of rectangular areas.

21 Claims, 7 Drawing Sheets

$$\tan A = \frac{Y+E}{X}, \quad X = (Y+E)\operatorname{ctn} A; \quad \tan B = \frac{Y+E}{X_2}, \quad X_2 = (Y+E)\operatorname{ctn} B$$

$$D = X + X_2 = (Y+E)\operatorname{ctn} A + (Y+E)\operatorname{ctn} B, \quad Y+E = \frac{D}{\operatorname{ctn} A + \operatorname{ctn} B}$$

$$Y = \frac{D}{\operatorname{ctn} A + \operatorname{ctn} B} - E, \quad X = (Y+E)\operatorname{ctn} A$$

$\tan A = \frac{Y}{X}, \quad X = Y \operatorname{ctn} A;$  $\qquad \tan B = \frac{Y}{X_2}, \quad X_2 = Y \operatorname{ctn} B$ $D = X + X_2 = Y \operatorname{ctn} A + Y \operatorname{ctn} B, \qquad Y = \dfrac{D}{\operatorname{ctn} A + \operatorname{ctn} B}$ $X = Y \operatorname{ctn} A$

FIG. 11

AMBIENT-LIGHT-RESPONSIVE TOUCH SCREEN DATA INPUT METHOD AND SYSTEM

FIELD OF THE INVENTION

The present invention is in the field of touch screens wherein the operator communicates with, i.e. feeds data into a computer by means of pointing to the touch screen. More particularly, this invention relates to a passive touch screen method and system wherein a pointer reflective of ambient light or capable of creating sharp shadows is brought near to the rectangular touch screen area for feeding data into the system. The pointer need not actually touch the subject passive rectangular area but only be brought near to this area, because ambient light is employed as the medium to sense the positioning of the pointer. By virtue of the ruggedness made possible by the passive nature of the panel, it does not become degraded from repeated pointer impacts and is easily wiped clean, and may be washed. The touch screen area may advantageously be a two-dimensional area in space or in the air.

BACKGROUND

There are computer systems in which an operator interacts with the system by touching or pointing to various positions within a touch screen area. The touch screen serves as easily used data input apparatus because the operator can quickly and easily feed data into a computer by indicating various specific positions of the touch screen area.

The term "pointer" as used herein means a stylus, rod, dowel, finger, pencil, or similar relatively long and slim element which is readily movable by hand and which is easily oriented generally perpendicular to a two-dimensional plane surface or area in space or in the air and is easily moved relative to the area while being held in such a generally perpendicular orientation.

As used herein, the term "touch screen" (whether singular or plural) means apparatus used to locate the position of a pointer oriented generally perpendicular to a two-dimensional plane. In accordance with the present invention, such a two-dimensional plane may be an area defined on or near the surface of solid material, such as near an inert panel, or may be a geometric plane defined in space or in the air.

Such "touch screens" have many possible applications, for example: pointing to or selecting a particular image or region on a video screen or on a panel, plate or tablet to select or indicate a specific item, informational element, letter, number, symbol, parameter line, region or characteristic; to locate or track a pointer held generally perpendicular to the plane and moved along the plane for plotting data, drawing a graph or picture or for laying out a network or diagram; for indicating or tracking the relative motion or coordinates of movement or trajectory of a moving object; for use as a custom keyboard in an electronic input module; and so forth.

Existing touch screens in use today suffer from a number of problems or shortcomings.

An optical touch screen system uses numerous light-emitting diodes (LED's) arranged along two adjacent borders of a rectangular area for emitting crossed beams of infrared radiation traversing the touch screen area, and numerous photodetectors arranged along the other two borders for sensing these beams. These systems are adversely affected by ambient light which can cause misreadings of the photodetectors. The numerous LED's and detectors involve maintenance problems, because they become coated by dust or dirt and must be cleaned carefully and are subject to misalignment if the mounting frame is significantly bumped or jarred. These optical systems provide only a medium resolution, typically providing only 40 by 27 individually responsive spots, a total of about 1,080 respective spots. They evidence a relatively large parallax when used in front of a video screen, because the infrared beams are spaced relatively far away from the face of the video screen, with the parallax problem being most apparent near the corners of the video screen. The reliability of optical touch screen systems is only fair, due to the fact that the beams are so very easily accidentally interrupted, for example, by a dropped object or sheet of paper, thereby feeding false and confusing data into the system.

Acoustic surface touch screen systems typically provide only medium resolution of 40 by 27 individually responsive spots, the same order of resolution as for optical systems discussed above. These systems involve numerous piezoelectric transducers arranged along two borders of a vibratable glass surface for generating acoustic waves which ripple over the glass surface and are reflected in an echo pattern from the touched spot. These acoustic systems tend to be unreliable, because the acoustically vibrating glass surface is extremely sensitive and easily causes misreadings due to dirt or small scratches on the vibrating glass surface which create spurious echoes. Parallax of acoustic surface touch screens is a major drawback due to the thickness of the vibrating glass thereby offsetting the touch sensitive areas spaced relatively far from the face of a video screen.

Capacity sensing touch screen systems provide a relatively low resolution because they involve relatively large touch sensitive regions, for example, each such region may measure about ½ square inch in area. This very low resolution with such relatively large area individual touch sensitive regions considerably limits the applications and uses for which capacitance touch screens can be employed. A capacitive-type touch screen system is the most durable and reliable of the presently commercially available systems, but its resolution is very low as already pointed out. Capacitive touch screens are adversely affected by temperature and humidity fluctuations.

Resistance membrane touch screen systems offer the highest resolution now commercially available. Numerous fine parallel resistive electrodes are etched onto the surfaces of two mylar plastic sheets with these electrodes on the two sheets being oriented at right angles to each other in a sandwich. Numerous voltage-drop sensors arranged along two edges of this sandwich with associated measuring circuits including analogue to digital converters are needed to sense and to locate the touched spot. Depending upon the cost and complexity of such a system resolution can range from 256 by 256 pixels up to 4,000 by 4,000 pixels. The pair of etched mylar plastic membranes which are used in these resistance membrane systems are very delicate and very easily damaged. When used on the face of a video screen such resistance membranes have been known to slide slightly from their original locations, thereby creating parallax errors. Their optical transmission attenuation and dispersion due to their etched surfaces cause reduced visibility and clarity of video images as seen through these etched membranes. Also, the characteristics of the exposed parallel resistance electrodes on the membrane surfaces change with humidity. Thus, the resistance membrane screen must be relinearized each time that the system is turned on.

Transparent membrane (X Y Switch Matrix) systems offer relatively high resolution, typically providing 64 by 64 touch responsive points, thus giving an overall total of 4,000 touch points. These systems include two closely spaced but normally separated layers of optical grade polyester film each having a set of parallel electrically conductive flexible electrodes. The sets of electrodes in the two spaced polyester sheets are oriented at right angles to each other, and there are numerous digital switches. A digital switch is connected to each electrode. Sufficient force must be exerted against a touch point on the upper (or outer) polyester sheet to deflect that local area of electrodes on the upper sheet into contact with an electrode on the lower sheet for ativating the respective digital switches for the X and Y coordinates. The X Y Switch Matrix touch screen systems are expensive, and the upper (or outer) polyester sheet is exposed and subject to damage from excessive deflection pressures or sharp pointers.

The various touch screen systems as discussed above employ five types of existing technology. Each system involves a relatively large number of components, and thus considerable assembly time is needed in manufacturing any of these prior systems. Their costs are relatively high in proportion to the total numbers of touch responsive areas which are provided.

Also, any given prior art touch screen system is inherently fixed in size. Once the numerous detectors, LED's, transducers, capacitance elements, resistive elements, analogue to digital converters, contact electrodes, digital switches, etc. have been arrayed, the touch screen size is confined and limited to that particular size of the array.

SUMMARY OF THE DISCLOSURE

Current touch screen systems comprise a great many more components and require a great deal more assembly work than a touch screen system embodying the present invention, and thus this invention provides durable touch screen systems at considerably reduced cost compared with current systems.

With commercially available line arrays of photoresponsive elements, touch screen systems embodying the invention can provide angular resolutions of better than one thousandth of 90° in the location of a pointer brought near to the touch screen area.

Current touch screen systems using resistive, capacitive and X Y matrix switching involve screen overlays which reduce visibility of the underlying video screen and which are prone to damage. A touch screen system embodying the present invention for use with a video screen can use a clear pane of glass or plastic in front of the video screen. Alternatively, two photosensor units can be mounted directly on a frame or support near the video screen proximate to two corners located at opposite ends of one of the longer margins of the video screen Thus, advantageously, the touch screen may be defined as involving a two-dimensional area in the air located a very small distance in front of the video screen.

The compact size and nature of the two photosensor units which are mounted proximate to but outside of two successive corners of the touch screen area enable quick and easy mounting without need for precision accuracy in their installation. For example, these units can be mounted with more than adequate accuracy merely by using eyesight to align and orient their respective positions proximate to the two corners of the touch screen area.

By virtue of their compact size and simplicity of their installation, the two photosensor units can readily be removed and relocated on various panels or supports defining two-dimensional areas of varying dimensions and shapes, e.g. rectangular or square. The sensor units may be mounted near the corners of video screens, as may be desired, for the convenience of the user in various applications.

In accordance with the present invention in one of its aspects there is provided the method for converting a rectangular area into a touch screen comprising the steps of: preselecting a conveniently located rectangular area substantially uniformly illuminated with ambient light, said rectangular area being defined by successive first, second, third and fourth boundaries, positioning a first line array of closely spaced photo-responsive elements proximate to but outside of a first corner of said rectangular area, said first corner being at the junction of said first and second boundaries, facing said first line array toward said rectangular area and orienting said first line array generally perpendicular to a first straight line bisecting the included angle between two straight lines from said first line array to the respective far ends of said first and second boundaries, focusing light from a field of vision extending at least between the whole of said first and second boundaries with limited height above said area onto said first line array, positioning a second line array of closely spaced photo-responsive elements proximate to but outside of a second corner of said rectangular area, said second corner being at the junction of said second and third boundaries, facing said second line array toward said rectangular area, orienting said second line array generally perpendicular to a second straight line bisecting the included angle between two straight lines from said second line array to the respective far ends of said second and third boundaries, focusing light from a field of vision extending between the whole of said second and third boundaries with limited height above said area onto said second line array of photosensors, using said first line array for measuring the angle "A" of change in light intensity level at a point within said rectangular area caused by a pointer oriented generally perpendicular to said area and brought near to said point, said angle "A" being measured at said first corner between a base line parallel to said second boundary and a straight line of vision extending from said first corner to said point, using said second line array for measuring the angle "B" of change in light intensity level at said point, said angle "B" being measured at said second corner between a base line parallel to said second boundary and a straight line of vision extending from said second corner to said point, calculating the cotangent of angle A relative to said base line, calculating the cotangent of angle B relative to said base line, calculating the vertical distance "Y" from said second boundary to said point by dividing the distance "D" measured along said base line between said first and second corners by the sum of the cotangent of angle A and the cotangent of angle B and then subtracting the offset "E" of said base line from said second boundary, and calculating the horizontal distance "X" from said first boundary to said point by multiplying the value Y times the cotangent of angle A, thereby employing ambient light for converting a rectangular area into a touch screen for determining the X and Y coordinates of any point within said area near to which is brought a pointer oriented generally perpendicular to said area.

In accordance with the present invention in another of its aspects there is provided touch screen apparatus comprising at least two photosensor units adapted to be mounted proximate to but outside of a pair of successive corners of a two-dimensional touch screen area. Each of said photosensor units includes a front and a rear, with means for mounting the unit, and includes a line array of closely spaced photoresponsive elements in the rear of the unit extending along the rear of the unit, with a lens assembly in the front of the unit intended to face toward said two-dimensional area. The lens assembly transmits light from a field of vision spanning said two-dimensional area with limited height above said area onto said line array of photoresponsive elements in the rear of the unit for activating at least one of said photoresponsive elements when a pointer is brought near to any point of said touch screen area when said area is substantially uniformly illuminated with a significant amount of ambient light.

BRIEF DESCRIPTION OF THE DRAWINGS

The invention, together with further objects, aspects, advantages and features thereof will be more clearly understood from a consideration of the following description taken in conjunction with the accompanying drawings in which like elements will bear the sam reference designations throughout the various FIGURES.

DETAILED DESCRIPTION OF PREFERRED EMBODIMENTS

Figure 1:
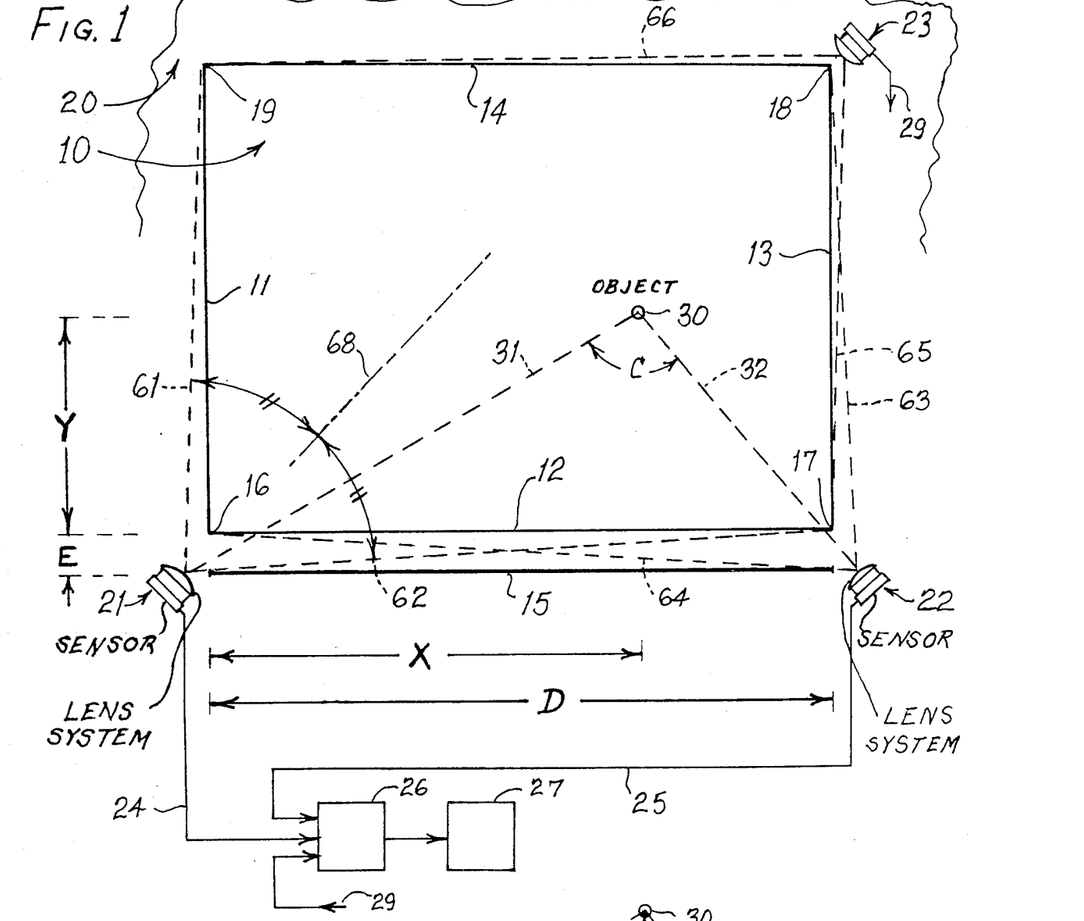
FIG. 1 is a plan view of a flat passive panel touch screen embodying the present invention and employing the method of this invention for putting data into a data processing system.

In FIG. 1 there is shown a two-dimensional touch screen area 10 which is illustrated as being defined near a flat passive panel 20. It is to be understood that this two-dimensional area 10 may be trapezoidal, diamond-shaped, rhombus-shaped, parallelogram-shaped, rectangular, square or portions of any of these shapes. The most convenient shape is usually rectangular, and so the shape of the two-dimensional area 10 as shown is rectangular.

It is also to be understood that this two-dimensional area 10 may be defined in space or in the air. However, it is usually more convenient to define this two-dimensional area 10 as being near a panel 20, so that a user has the natural human satisfaction of aiming the pointer to touch a solid surface rather than touching a point within a two-dimensional area 10 defined in mid-air.

This panel 20 may be any convenient durable, passive opaque material for example such as plywood, hardboard, sheetrock, or flat wall, etc., or durable transparent material for example such as a pane of glass or transparent rigid plastic.

It is preferred that this panel 10 be readily cleanable, preferably washable. In using touch screens most people usually want to touch a screen area. Touching is a natural inclination in pointing to a selected point on a nearby area. In touch screen systems embodying this invention, it is not necessary that the pointer ("OBJECT") 30 actually come into contact with the screen area 10. It is only necessary that the pointer 30 be oriented generally perpendicular to the area 10 and that it be brought near to this area while being held in such orientation, as will be explained, in order to feed data into the system. However, since most people will be touching this screen 10, or writing, or drawing upon it, the panel 20 is preferably cleanable or even washable from time-to-time. Since the panel 20 is relatively inexpensive, it can be replaced readily by demounting a pair of photosensor units, to be described, and by mounting them upon the replacement panel.

The two-dimensional touch screen area 10 may be any convenient size for the intended use. In installations using a transparent pane 20, the touch screen area 10 is intended to be located before a video or tracking screen, selection chart or other presentation of informational items to which the operator points the pointer 30 for feeding data into a data processing system.

Figure 3:
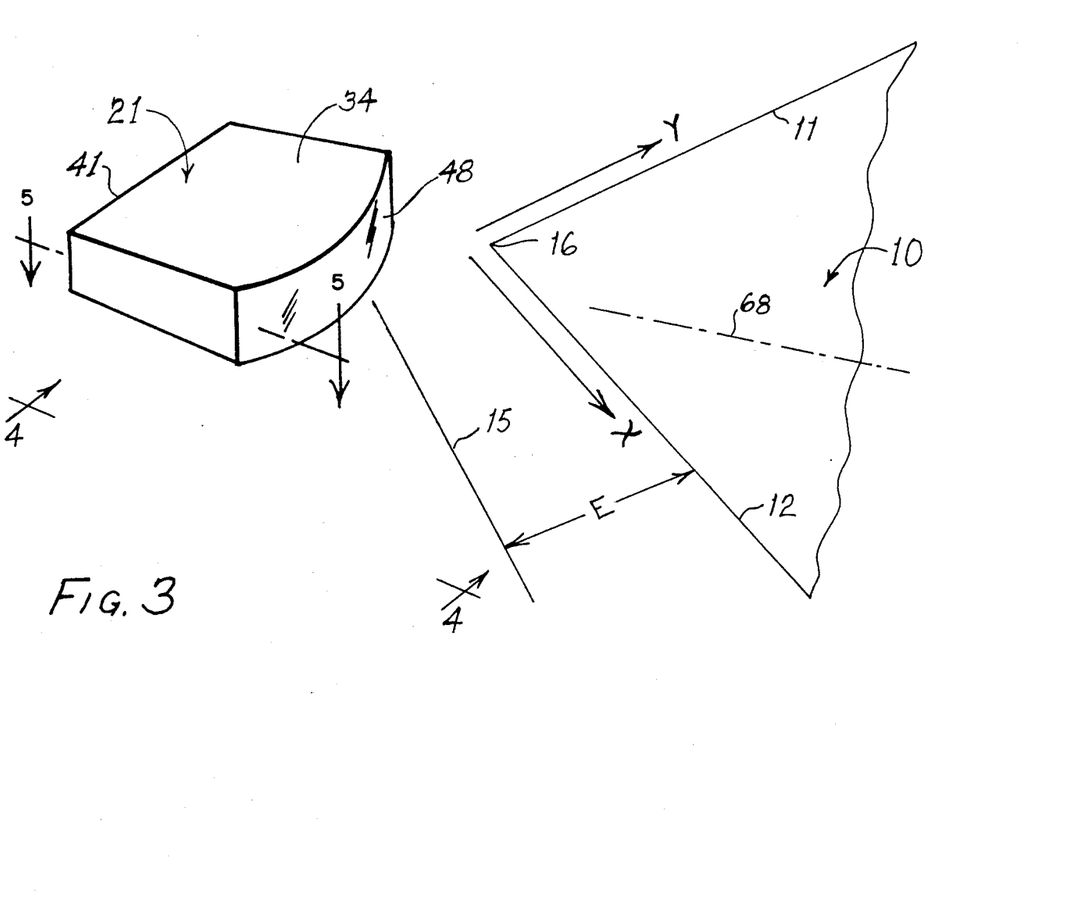
FIG. 3 is a perspective view of one of the photo sensor units positioned proximate to (but outside of) a first corner (the "ORIGIN") of the rectangular touch screen area and showing only a portion of the touch screen area near this first corner.
Figure 4:
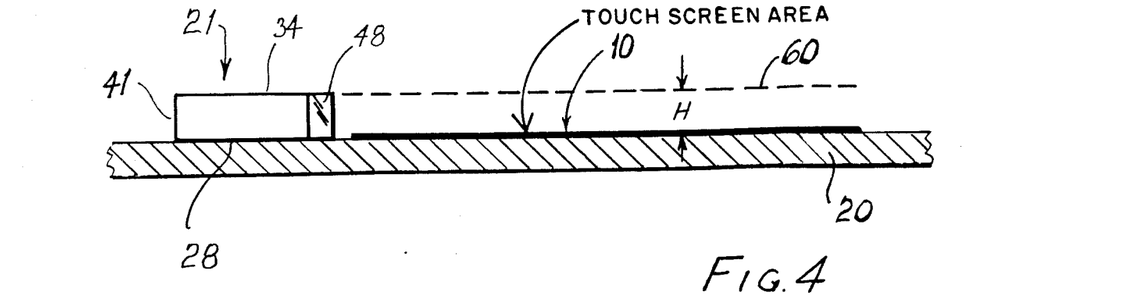
FIG. 4 is an elevational view of the photo sensor unit of FIG. 3 and the proximate portion of the touch screen area as seen looking from the direction 4—4 in FIG. 3.

The touch screen area 10 is defined by successive first, second, third and fourth boundaries 11, 12, 13 and 14, respectively. There is a first corner 16 of the touch screen area 10 at the juncture of the first and second boundaries 11 and 12, and a second corner 17 at the juncture of the second and third boundaries 12 and 13. Mounted on the panel 20 proximate to the first and second corners 16 and 17 are first and second photosensor units 21 and 22, respectively, which are identical in construction. The first of these photosensor units 21 is shown in FIGS. 3 and 4.

These photosensor units 21 and 22 may be removably mounted or permanently mounted on the panel 20 by any desired fastening or attaching means 28 (FIG. 4) for example by adhesive or pressure-sensitive adhesive, Velcro hook and loop fasteners, screws, bolts and nuts, snap-on clips, etc. These photosensor units 21 and 22 are connected by means of respective electrical cables 24 and 25 with a data processing system 26 which is shown connected to a computer 27. This data microprocessor 26 carries out the steps shown in FIGS. 10 and 11, including the steps illustrated in FIGS. 2 or 9, as will be explained later.

The touch screen area 10 is substantially uniformly illuminated by a significant amount of "ambient light", which is preferred to be diffuse in nature. The source of this ambient light may be natural light from out-of-doors entering into a room in which the panel 20 is located through one or more windows and/or one or more skylights in the ceiling. This ambient light may be artificial light from one or more incandescent, fluorescent, halogen, sodium vapor or other artificial light sources. Also, this "ambient light" may be a combination of natural and artificial light. If the intensity level of light from natural and/or artificial sources is initially too low in the room to meet the dual criteria of (a) proper operation, and (b) ease of viewing, then auxiliary lighting may be employed, and such auxiliary lighting when employed is considered to be included within the meaninq of "ambient light".

The term "significant amount of ambient light" is intended to mean that there is sufficient intensity of such ambient light impinging upon each and every point of the area 10 to activate the photosensor units 21 and 22 when the pointer 10 is brought near to that point. Also, this term is intended to mean that there is sufficient light intensity at each point of the area 10 for enabling easy viewing of each point on the whole of area 10 by the operator and by observers, if present in the room with the operator. In summary, this term means that there is sufficient ambient light for the touch screen system to operate properly and for easy viewing by those persons who are involved in operating or using this touch screen system.

Although the touch screen area 10 is shown as rectangular, it is to be understood that another convenient shape for this area may be square, if desired, namely, a rectangle with four equal boundaries 11, 12, 13 and 14. When this area 10 is rectangular, the photosensor units 21 and 22 are preferred to be mounted proximate to corners 16 and 17 which are located at opposite ends of one of the longer boundaries 12 of the touch screen area 10. The two photosensor units 21 and 22 may alternatively be mounted proximate to the third and fourth corners 18 nd 19, respectively, near opposite ends of the other longer side 14.

The presently preferred embodiments employ a panel 20 having a low reflectance for ambient light, for example being dull black, dull dark brown or dull dark green, etc., and to use the reflected light from the pointer 30 rather than to use the shadow cast by this pointer. It is preferred to have the area 10 oriented generally vertically or at a slope to the horizontal, and it is preferred that the sensor units 21 and 22 be located near the upper two corners 18, 19 of the area 10, so that these units 21 and 22 face generally downwardly. There are at least four reasons for preferring a non-horizontal orientation of the area 10 with a downwardly facing orientation for the sensor units: (i) avoiding problem of dirt falling onto the front 48 (FIGS. 3 and 4) of the photosensor unit, (ii) avoidance of direct impingement of light onto the front 48 of the sensor unit, since many sources of ambient light are in the ceiling or overhead or elevated, (iii) with a non-horizontal area 10, the pointer 30 will be oriented away from vertical thereby better reflecting ambient light coming down from above, and (iv) the downwardly facing sensor units will better receive the upwardly reflected light coming from the pointer 30, reflected from overhead light sources.

By virtue of mounting these photosensor units near the opposite ends of one of the longer boundaries 12 or 14, the viewing lines 31 and 32 (see also FIG. 2) from the pointer 30 at any point within area 10 to the respective photosensor units 21 and 22 generally on average will intersect at a larger angle "C" at the pointer 30, thereby yielding a more accurate "fix" (in a navigational sense), than would be the case if these two photosensor units were mounted near opposite ends of one of the shorter boundaries 11 or 13.

If desired, a third sensor unit 23 may be mounted outside of the area 10 proximate to a third corner 18. This third sensor unit 23 is identical to the units 21 and 22, and it is connected via an electrical cable 29 with the data microprocessor 26. The reason for having a third sensor unit 23 is that it will enable the position of the pointer 30 to be determined with greater accuracy in certain instances, for example, when the pointer is so near the boundary 12 that the angle "C" is approaching 180°, i.e. is approaching a straight angle.

This use of a third sensor unit 23 is not necessary and is being mentioned merely as an indication of the extreme flexibility or adaptability of this invention.

The sensor units 21 and 22 are preferably mounted slightly below the level of the boundary 12 as is shown in FIG. 1, so that the angle "C" does not approach too close to 180° when the pointer 30 is located near the boundary 12. For example, as shown, these sensor units 21 and 22 are mounted near opposite ends of a base line 15, which is parallel to the boundary 12 and is offset from this boundary 12 by an offset distance "E". The base line 15 has a length "D" which is equal to the length of the boundary 12 and its two ends are aligned with the two corners 16 and 17.

Figure 5:
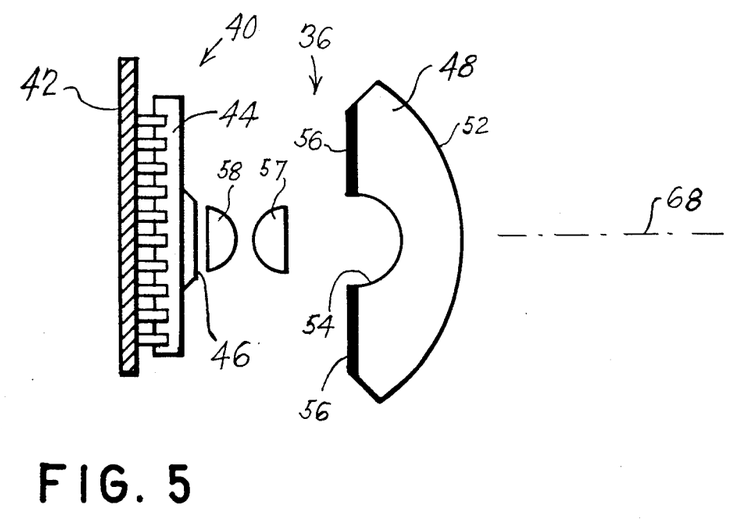
FIG. 5 is an enlarged and partially diagrammatic plan view of the lens system and line array of photosensors included in the photosensor unit of FIGS. 3 and 4, being a plan view taken along the plane 5—5 in FIG. 3.

Inviting attention to FIGS. 3, 4 and 5, a photosensor unit, for example, the unit 21, includes a casing 34 having a lens assembly 36 (FIG. 5) in the front and a compact line array 40 of numerous very closely spaced photo-responsive elements extending in a line across the rear 41 of this housing. For example, this line array 40 of photo-responsive elements includes 128, 256, 512 or 1024 individual photo-responsive elements, depending upon the desired resolution of this touch screen system and these individual elements may be spaced 25 micrometers on centers or even as close as about 13 micrometers on centers. Thus, a line array 40 of 1024 of such photo-responsive elements can occupy a length of only about 25.6 millimeters, namely, about one inch long or even less. This advantageous compact short line array 40 is in sharp distinction to prior touch screen systems wherein the numerous active elements, such as detectors, LED's, transducers, etc., are arrayed along the entire length of two or more margins of the whole screen.

Figure 6:
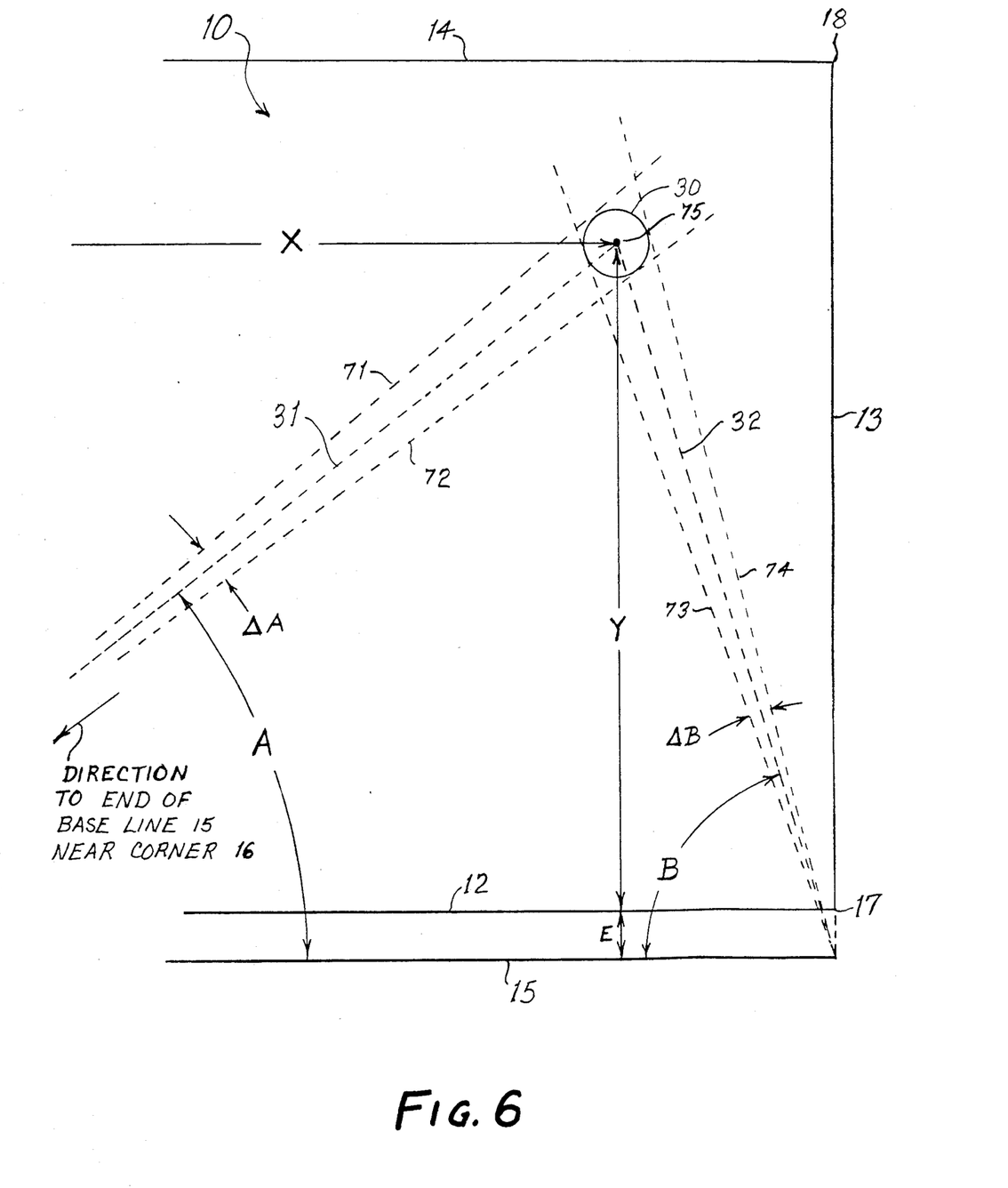
FIG. 6 illustrates the resolution of this touch screen at a point near a corner of the touch screen area remote from the "ORIGIN".

A touch screen system embodying the present invention in which each line array 40 in the two photosensor units 21 and 22 includes 1024 individual photo-responsive elements advantageously has the capability of distinguishing 1,048,000 points within the area 10. The actual resolution in practice, as will be explained in connection with FIG. 6, is an angular function With 128 photo-responsive elements in each photosensor unit 21 and 22, the resolution at a distance of 25 inches from each photosensor unit 21, 22 is 0.339 of an inch and with 1024 photoresponsive elements, the resolution 25 inches from each unit 21, 22 is 0.0379 of an inch. The resolution is further defined by the thinness or thickness (sharpeness or bluntness) of the pointer 30 relative to its distance from the respective photoresponsive unit 21 or 22. At any given distance from a photosensor unit 21 or 22, a thinner (sharper) pointer gives a higher resolution than a thicker (blunter) pointer, within reasonable limits of pointer thinness versus thickness.

As an example, this line array 40 includes a printed circuit board 42 having a line scan image sensor 44 mounted on the circuit board, for example, charge-coupled light sensors, such as the Fairchild CCD 111 (a 256-Element, Line Scan Image Sensor), which is commercially available from Fairchild Opto Electronics Division, Fairchild Semiconductor, 3105 Alfred Street, Santa Clara, Calif., or a solid state line scanner, such as the Reticon G-Series of solid state line scanners commercially available from E G and G Reticon, 345 Potrero Avenue, Sunnyvale, Calif. A desirably sensitive small line array 40 about 1/16th of an inch long having 128 elements which are quite uniform in response is available from Texas Instruments, Inc., of Dallas, Texas as line scanner TC102. The image sensor 44 includes a sensor window 46, and the lens assembly 36 is aligned with this sensor window 46.

The lens assembly 36 includes as its objective lens 48, a concavo-convex lens with its convex surface 52 facing outwardly and having a concave rear surface 54 of greater curvature than the convex surface. The planar rear surfaces of this objective lens 48 are coated with a black, light-absorbing and non-reflective opaque mask 56. Located between the objective lens 48 and the sensor window 46 is shown a pair of plano-convex lenses 57 and 58 which serve as a collimator for light rays coming from various points in the area 10 and which have been collected and focused by the objective lens 48 for directing these collimated rays in parallel relationship into the sensor window 46.

An example of a way to make a successful lens assembly 36 is to use the objective lens 48 (front element) of a Brainerd No. 649 Super Wide Angle Door Viewer, which is commercially available from Brainerd Manufacturing Company of East Rochester, New York. Then, in lieu of the two plano-convex lenses there is used a very short focal length double-convex acromat lens having a shorter focal length than the focal length of the components found in the rear of the Brainerd No. 649 Door Viewer. The particular lens or lenses which are used at 57, 58 near the sensor window 46 of the line array 40 of photoresponsive sensors will depend upon the characteristics and size of the line array 40. A pair of plano-convex lenses may be used as shown or a double convex acromat lens of very short focal length may be used with the TC 102 line array 40.

The photosensor unit 21 or 22 or 23 is arranged to have a field of vision with limited height H (FIG. 4) above (meaning in front of) the touch screen area 10, as indicated by the limited height vision limit dashed line 60 in FIG. 4. This limited height of vision limit 60 occurs as a result of the action of the lens assembly 36 (FIG. 5) in focusing and collimating the light rays into the sensor window 46 combined with the narrow line array 40 of small closely spaced photo-responsive elements extending along the rear 41 of the casing 36.

The lateral field of vision of each photosensor unit 21 or 22 extends at least over the angular range between the whole of the two adjacent boundaries, i.e. to their far corners. The lateral field of vision of the photosensor unit 21 extends at least over the angular range between the dashed lines 61 and 62, and that of the unit 22 extends at least over the angular range between dashed lines 63 and 64. Similarly, the field of vision of the unit 23, if used, extends at least over the angular range between the dashed lines 65 and 66.

For the most efficient geometric deployment of the line array 40 (FIG. 5) and the lens assembly 36 in each unit 21 or 22 or 23, this line array 40 is oriented perpendicular to a centerline 68 which bisects the angle between the respective viewing lines 61, 62 or 63, 64 or 65, 66 which span the whole area 10. Another way of expressing this same relationship is to note that the rear 41 of each casing 34 is oriented at an acute angle in the range from about 45° to 30° to the straight base line 15 which is parallel with the boundary 12 extending between the respective nearby corners 16 and 17, depending upon the length-to-breadth rectangular configuration of area 10.

Figure 8:
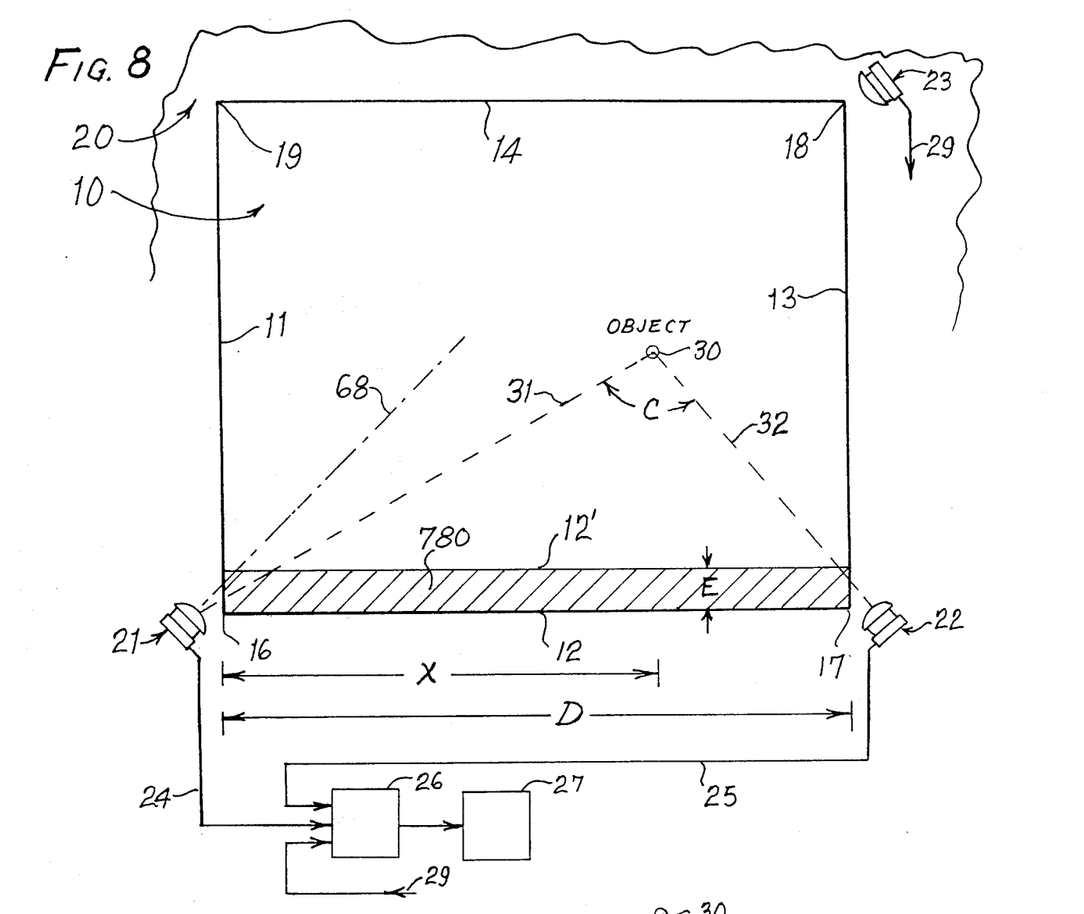
FIG. 8 is similar to FIG. 1 showing an alternative mounting arrangement wherein the trigonometric analysis is simplified.
Figure 9:
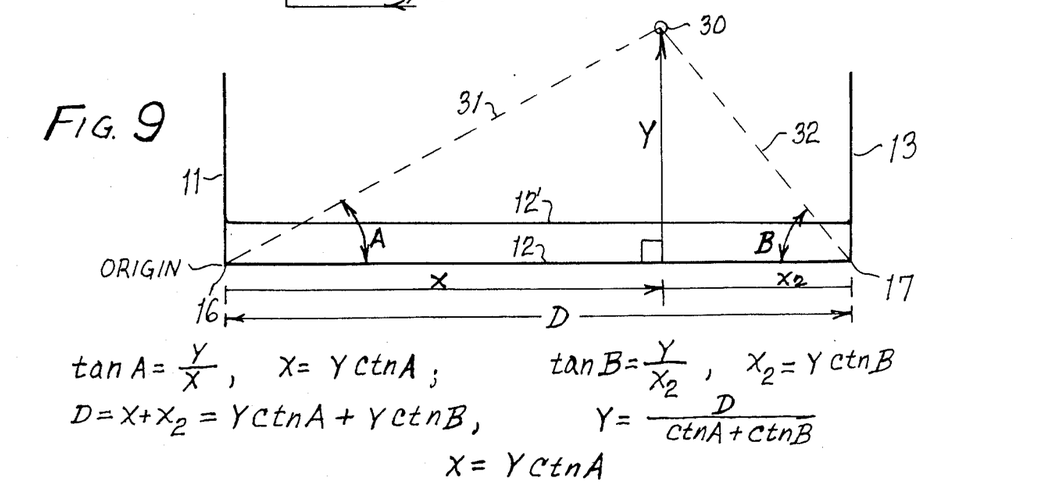
FIG. 9 illustrates trigonometric calculations for the arrangement of FIG. 8.

Returning attention to FIGS. 1 and 2, there is a signal data microprocessor 26 connected to a computer 27, and the processor 26 is programmed to perform the geometric circulations shown in FIGS. 2, 8 and 9. The signals from the line array 40 of the photo-responsive elements in the respective photosensor units 21 and 22 and possibly 23 are fed through the respective cables 24, 25 and 29 into this microprocessor 26.

Consequently, in operation, when a pointer 30 is brought near to a desired point in the touch screen area 10, as shown in FIG. 1, the resulting change in light intensity as seen along the straight lines 31 and 32 of vision of the respective photosensor units 21 and 22 causes the corresponding photoresponsive element in each array 40 to transmit a signal to the computer system 26, 27. The signals from the first and second sensor units 21 and 22 correspond to respective angular positions A and B (FIG. 2) of the pointer 30. The length dimension "D" of the boundary 12 between the respective nearby corners 16 and 17 (and also the length of base line 15) depends upon the desired size of the touch screen area 10. For example, this dimension "D" may be any desired value in the range from about five inches up to ten or fifteen feet, or even more. This dimension "D" and the offset "E" of the base line 15 are the initial data which are fed into the microprocessor 25 when the sensor units 21 and 22 are mounted on the panel 20 or on a frame near a touch screen area 10.

Figure 2:
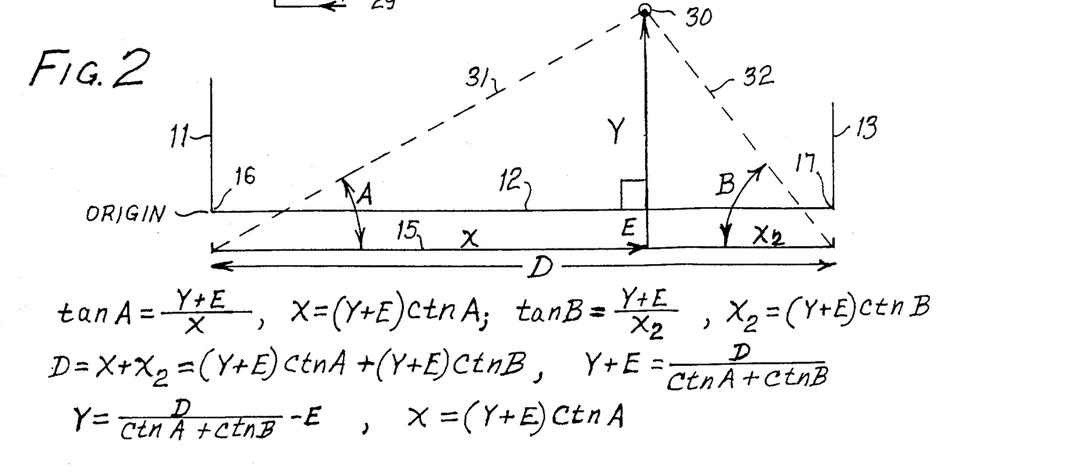
FIG. 2 illustrates trigonometric calculations used to determine the X and Y cartesian coordinates of any point within a rectangular touch screen area on the panel to which is brought a pointer ("OBJECT") oriented generally perpendicular to the panel.

1. The computer system determines the cotangent of angle A and the cotangent of angle B.

2. The vertical coordinate distance Y of the pointer 30 from the boundary 12 is calculated by the geometric formula:

$$Y = \frac{D}{CtnA + CtnB} - E \qquad (a)$$

3. Now that the value of coordinate Y has been determined, the horizontal coordinate distance X of the pointer from the boundary 11 is calculated from the geometric forumula:

$$X = (Y+E)CtnA \qquad (b)$$

In order to normalize these formulas so as to make them universal for any value of D and E, the coordinates X and Y are expressed as a proportion of the length D of the boundary 12 and as a function of the offset E, as follows:

$$\frac{Y}{D} = \frac{1}{CtnA + CtnB} - \frac{E}{D} \qquad (c)$$

$$\frac{X}{D} = \frac{(Y + E)CtnA}{D} \qquad (d)$$

In order to explain further the resolution of a touch screen system embodying the present invention and the method of optimizing this resolution, attention is invited to FIG. 6. The pointer object 30 has been brought near to a point 75 in the touch screen area 10 which happens to be shown by way of example near the upper right hand corner 18 for purpose of explanation; and the relative size of the pointer 30 as compared with the size of area 10 is shown considerably enlarged. The presence of pointer 30 near the area 10 causes a change in light intensity to occur at the end of base line 15 near corner 16. This change in light intensity occurs between the lines of vision 71 and 72, which graze the opposite sides of the pointer 30, as viewed by the photosensor unit 21 near corner 16. Similarly, there is a change in light intensity at the end of base line 15 near corner 17 occurring between the lines of vision 73 and 74 which graze opposite sides of the pointer as viewed by the photosensor unit 22 near the latter corner. The angular difference between the pairs of viewing lines 71 and 72, 73 and 74 is seen to be ΔA and ΔB, respectively. In geometric terms, the pointer 30 subtends the angles ΔA and ΔB, as viewed from the respective sensor units near corners 16 and 17.

Depending upon the actual thinness or thickness of pointer 30 and its distances from the first and second corners 16, 17 and depending upon the number of photo-responsive elements in the line arrays 40 in the sensor units 21 and 22, it is likely that more than one photo-responsive element is activated in each sensor unit 21 and 22 by the presence of the pointer 30. Thus, a plurality of successive adjacent photo-responsive elements in each line array 40 are likely to be simultaneously activated by the presence of pointer 30 near the touch screen area 10, i.e. closer than the limit 60 (FIG. 4) of the limited height field of vision. This change in light intensity may occur as a result of reflected light due to a pointer whose surface has a high albedo capable of reflecting a significant proportion of ambient light incident upon it compared with reflectance of the touch screen area 10 as viewed from the corners 16 and 17. Alternatively, this change in light intensity may occur as a result of sharp shadowing due to a pointer whose surface has a low albedo capable of absorbing a significant proportion of ambient light incident upon it as compared with the absorbance of the touch screen area 10 as viewed from the corners 16 and 17.

Therefore, in order to determine the cotangents of angles A and B, as described in paragraph No. 1 above, the computer system first determines the values of these angles A and B as accurately as possible from the data input so as to optimize the resolution of the touch screen system.

4. If only one photo-responsive element is activated in a line array 40 by the pointer 30 (FIG. 6), then the viewing line 31 or 32, as the case may be, to the center 75 of the pointer 30 is determined (calculated) to correspond to the known position of the particular photo-responsive element which is being activated.

5. If more than one adjacent photo-responsive element is activated by the pointer 30, which is the likely occurrence as described above, then the viewing line 31 or 32 to the center 75 of the pointer 30 is determined (calculated) to correspond to the average of the viewing lines 71, 72 or 73, 74 to the lateral side edges of the pointer 30, as viewed from the respective corner 16 or 17. The center 75 is the effective center of gravity of the pointer 30 as determined by the processor 26, as explained more fully later. The pointer 30 may, for example, be a finger. Thus, the viewing lines 31 and 32 to the center of gravity 75 of the pointer 30 are determined (calculated) to be those lines which generally bisect the respective angles ΔA and ΔB subtended by the pointer 30 as viewed from the respective corners 16 and 17.

As explained further above, employing line arrays 40 which include a larger number of closely spaced photo-responsive elements increases the resolution of this touch screen system because the location of the center 75 of the pointer 75 is more accurately determined. For example, if there are 1024 photoresponsive elements in the line arrays 40 and with a lateral field of vision of almost 90° between the respective viewing lines 61, 62 (FIG. 1) and 63, 64 then the angular resolution is 0.0879 of a degree. This angular resolution of less than one thousandth of 90° corresponds to a resolution in the values of coordinates X and Y which is considerably more accurate than obtainable with any currently available touch screen systems. This angular resolution yields linear resolution in the value of the coordinate X or Y at a distance of 25 inches of the pointer 30 from the corner 16 or 17 of 0.0379 of an inch. With only 128 photoresponsive elements in the line arrays 40, then the angular resolution is 0.7031 of a degree which yields a resolution in the X or Y value of 0.339 of an inch.

Figure 7:
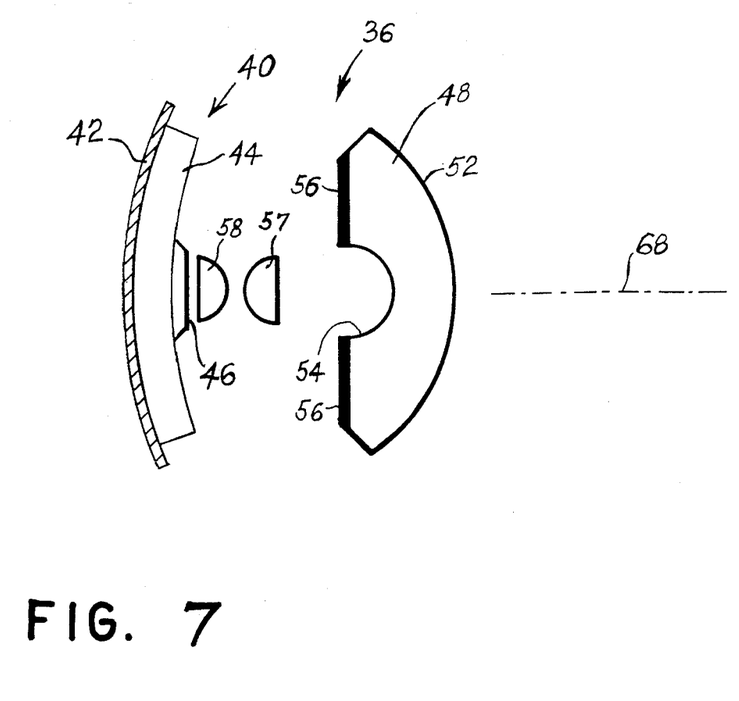
FIG. 7 is similar to FIG. 5, but FIG. 7 shows that the line array of photosensors may be curved, if desired.

As shown in FIG. 7, the line array 40 of photoresponsive elements in the sensor units 21 and 22 may be curved, if desired. Thus, the term "line array" is intended to include a straight or a curved line array.

It is to be understood that the panel 20 with its touch screen area 10 and photosensor units 21 and 22 mounted on this panel may be oriented at any desired angle with respect to the horizontal, e.g. with respect to the floor. For example, if the area 10 is located on wall, it is vertical; if located on a conference room table or on a desk top, it is horizontal. In many cases, the area 10 may be inclined at about the same angle as a typewriter keyboard, for example, in the range of about 20° to about 35° with respect to the horizontal for ease of usage by a seated operator over a considerable period of time with minimum fatigue, and units 21 and 22 are preferred to be near the upper corners for reasons already explained.

In order to illustrate the advantageous flexibility of applying the present invention to various touch screen arrangements, attention is invited to FIGS. 8 and 9 for comparison with FIGS. 1 and 2. In this embodiment of the invention shown in FIGS. 8 and 9, the units 21 and 22 are mounted near opposite ends of one of the longer boundaries 12 of the touch screen area 10. Thus, the boundary 12 of length D now is serving as did the base line 15 in FIGS. 1 and 2. In using the touch screen area 10, it is preferred that only the area beyond a secondary boundary 12' be employed so that the angle "C" does not approach too closely to 180°. In other words, the shaded area 78 is not intended to be used.

As shown in FIG. 9, the trigonometric analysis is simplified as compared with FIG. 2, because the offset distance "E" is not taken into account. The coordinate distance Y is now being measured from the base line boundary 12 with the ORIGIN at the corner 16, it being understood that the usable values of the coordinate Y are located above the secondary boundary 12', which is parallel with the boundary 12 and is offset therefrom by a reasonable distance, for example, equal to E.

The coordinate distance Y is now calculated by the formula:

$$Y = \frac{D}{CtnA + CtnB} \quad (e)$$

Then, the coordinate distance X is calculated from the formula:

$$X = Y\, CtnA \quad (f)$$

The above two formulas (e) and (f) are normalized for any value of D, as follows:

$$\frac{Y}{D} = \frac{1}{CtnA + CtnB} \quad (g)$$

$$\frac{X}{D} = \frac{Y}{D} CtnA \quad (h)$$

Substituting the right side of equation (g) into equation (h) gives the result:

$$\frac{X}{D} = \frac{CtnA}{CtnA + CtnB} \quad (i)$$

It is to be noted that substituting the value of Y+E derived from equation (a) above, into equation (d) above, will yield the same formula as (i) immediately above, because the coordinate value X does not involve the vertical offset distance E.

Figure 10:
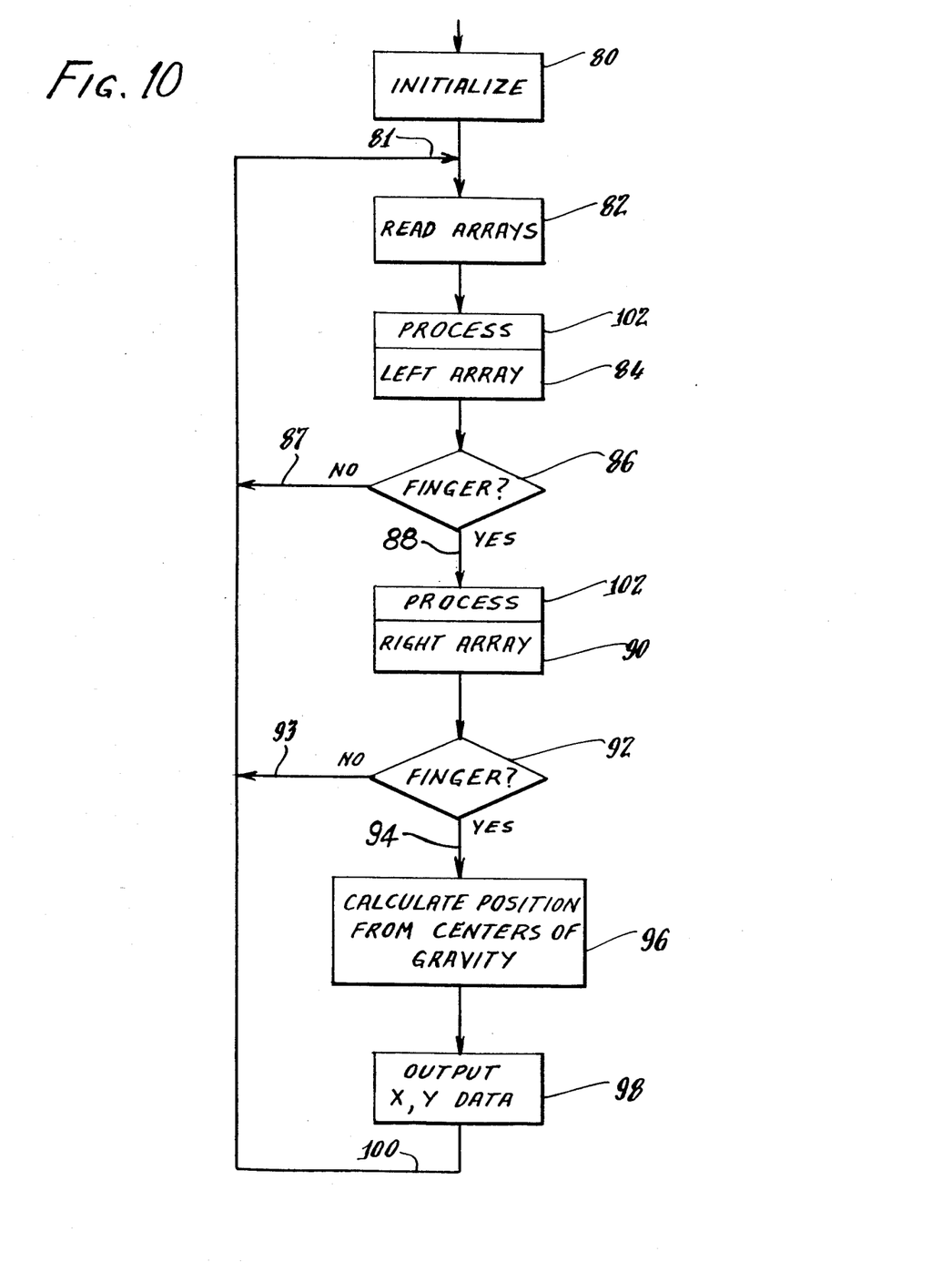
FIG. 10 is a flow chart of the program method used to calculate the X and Y coordinates of a pointer, for example, such as a finger.
Figure 11:
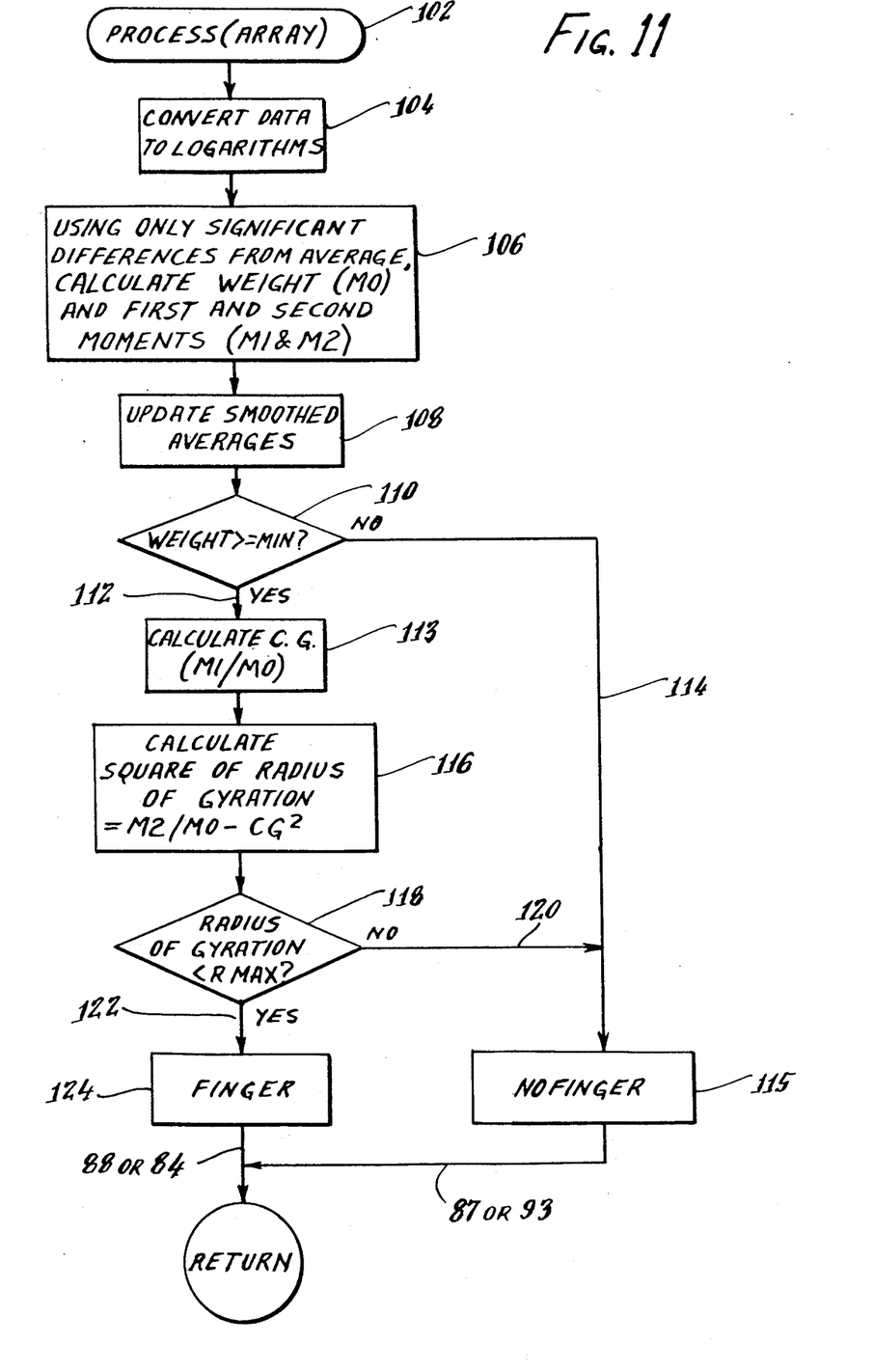
FIG. 11 is a flow chart of the program method steps involved in the routine to determine whether or not a pointer, for example, such as a finger, is present near the touch screen area. In other words, the method steps of FIG. 11 comprise the respective portions of FIG. 10 labelled "process left array" and "process right array".

A method which may be used to advantage to determine the position of the center of gravity 75 of a pointer 30, for example a finger, is shown by the diagrams in FIGS. 10 and 11 giving an overall view of the determination method program. Inviting attention first to FIG. 10, the program method as a whole includes the steps of initializing the processor 26 by booting it into readiness for operation and loading the program, as represented by the functional block 80. The signals from the respective line arrays 40 in the sensor units 21 and 22 are then read as represented by functional block 82. The data from the first or left sensor unit 21 is processed to determine whether a pointer such as a finger is present, as shown by functional block 84 and functional decision diamond 86. If no finger or other pointer is determined to be present, then the program returns to 81 for the first step so as to repeat the first section of the program as shown by the "no" decision arrow 87.

If an affirmative determination is made from the data of the first or left array 40 in sensor unit 21, as shown by the "yes" decision arrow 88, then the data from the second or right sensor unit 22 is processed to determine whether a pointer such as a finger is present, as shown by functional block 90 and decision diamond 92. If no finger or other pointer is determined to be present, then the program returns for starting at the first step 81, as shown by the "no" decision arrow 93.

The basis for making the functional determination 86 and 92 (whether or not a finger or other pointer 30 is present) is whether or not significant signals are being received from the respective line arrays 40. The ambient illumination on the touch screen area 10 will fluctuate from moment-to-moment due to people moving about in the room; due to movements of the operator's head, arms and body; due to fluctuations in line voltage; due to clouds in the sky, etc. The responses of the individual photo-responsive elements in the line arrays will also fluctuate due to statistical variations in their individual sensitivity and linearity, due to localized temperature variations, molecular and electronic motions and vibrations, etc. When a pointer object 30 is actually present, as will be understood from FIG. 6, then the signal from one or a plurality of adjacent photo-responsive elements will change significantly from the average signal level of all of the photo-responsive elements in that line array 40, as will be explained further in connection with FIG. 11.

If an affirmative determination is made from the data of the second or right array 40 in sensor unit 22, as shown by the "yes" decision arrow 94, then the determined position 75 of the center of gravity of the finger 30 or other pointer is used as being the position of this object 30 as shown by the functional block 96. Since the position 75 of the object 30 has now been determined, its X and Y coordinates are calculated in accordance with the formulas of FIGS. 2 or 8 and as set forth above, and are read out of the computer 26 as shown by functional block 98. Preferably the X and Y coordinate data are output from the computer 26 as normalized values, as proportions of D as shown by normalized formulas above.

As soon as the X and Y coordinate data have been output, the program returns to the beginning 81, as shown by the arrow 100 in readiness for determining the next position to which the pointer is moved.

Inviting attention to FIG. 11, this flow diagram further explains and represents the process steps 102 involved in the overall method system of functional block 84 and in functional decision diamond 86 for the data from the array 40 in the left sensor unit 21. The same process steps 102 are involved in the overall method system of functional block 90 and functional decision 92 for the data from the array 40 in the right sensor unit 22. As represented in FIG. 11 by functional block 104, the signal data from the particular line 40 is converted to logarithms. The overall average value level of the signals from all of the photo-responsive elements in an array 40 is calculated as represented by functional block 106. Then moment zero (MO) is calculated using only those signals whose values differ significantly from the ovarall average value level of all signals from that array 40.

This moment zero (MO) is the average calculated mathematical weight of only those signals whose values differ siqnificantly from the overall average value level of all signals from the particular line array 40.

The first and second mathematical moments (M1 and M2) of only those significant signals are then calculated based upon moment zero as represented by functional block 106.

The average values are recalculated and compared with prior calculations as shown by function block 108 in order to smooth the data for optimizing the calculations of moment zero and of the first and second mathematical moments.

If the weight of the first and second mathematical moments of the data are greater than a predetermined minimum value as shown by functional determination diaond 110, then a "yes" decision is made as shown by the functional decision arrow 112. This predetermined minimum value is set from trial experience with a given touch screen system; it is set sufficient ly high to eliminate false determinations that a non-existent finger is present due to non-uniformity or fluctuations in ambient illumination over the area 10 or due to non-uniform responses of the various photo-responsive elements in a given line array 40. This predetermined minimum is not set so high as to prevent operation of the touch screen system, when a reasonable intensity of ambient illumination is being used.

If the weight of the zero moment M0 of the data are less than this predetermined minimum value as shown at 110, then a "no" finger decision is made as shown by the functional arrow 114 and block 115.

When a "yes" determination 112 has been made, then as represented by the functional block 113, the mathematical center of gravity C.G. of the significant signals is calculated by dividing the first mathematical moment M1 by moment zero M0.

As represented by functional block 116, the square of the radius of gyration of the significant signals is calculated by dividing the second mathematical moment M2 by moment zero M0 and then subtracting the square of the mathematical center of gravity C.G.

Functional block 118 represents the final process steps involved in making the determination as to whether or not a finger or other pointer object 30 is actually present in the touch screen area 10. The radius of gyration calculated in accordance with the program steps of functional block 116 is compared with a predetermined reasonable maximum value "rmax". For example, "rmax" may be set at 5% of D or some other reasonable proportion of D. In other words, if the calculated radius of gyration is more than a predetermined percentage or fraction of D, then a negative "no" determination 120 is made, because such a large value for the radius of gyration means that some object larger than a finger is present, for example several contiguous knuckles of a hand have momentarily inadvertently been rested against the touch screen panel 20 inside of area 10 or a whole hand has been inserted into a touch screen area 10 defined in mid-air without a panel 20.

When the calculated radius of gyration is less than the predetermined "rmax", then a "yes" finger determination is made as shown by the functional arrow 122 and block 124.

As indicated by the functional arrows 87 or 93 and 88 or 94, the overall process steps 102 in the flow diagram of FIG. 11 are a further representation for the functional steps 84, 86 in FIG. 10 for the left array and also for the functional steps 90, 92 for the right array 96, as was explained previously.

The calculated values for the center of gravity C.G. are the values for the X and Y coordinates for the point 75 which are fed into the computer 27 (FIGS. 1 and 8) as represented by the functional block 98 "Output X, Y data", in FIG. 10.

Then, the program returns as shown by functional arrow 81 (FIG. 10) in readiness for determining the next coordinate values, X, Y when the pointer 30 is moved to a new location in the area 10.

If a third sensor unit 23 (FIGS. 1 and 8) is employed, then the program handles the signal data from units 22 and 23 in an analogous trigonometric analysis as previously carried out for units 21 and 22, except:

(i) The boundary 13 is now treated as the base line;

(ii) The calculated value of "Y" (distance of pointer 30 from new base line 13) is now treated as coordinate $X_2$ (FIGS. 2, 9).

(iii) The calculated value of "X" (distance of pointer 30 from boundary 12) is now treated as coordinate Y.

These X, Y coordinates determined by signals from units 22 and 23 are compared with coordinates X, Y determined by signals from units 21 and 22, and the final coordinate values as fed into the computer 27 are optimized from this comparison. For example, when the object 30 is near the central portions of boundary 12 (FIG. 1) or 12' (FIG. 8), then the coordinate values determined from signals from units 22 and 23 are likely to be more precise than determined from signals from units 21 and 22.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A touch screen system comprising:

first and second photosensor units, each of said photosensor units having a front and a rear, means for mounting said units proximate to but outside of first and second successive corners, respectively, of a touch screen area and facing toward said touch screen area, a line scanner array of closely spaced photoresponsive elements in the rear of each of said units, a wide angle viewing lens assembly in the front of each of said units having a lateral field of view spanning said touch screen area for transmitting light from said lateral field of view with limited height above said touch screen area onto said line scanner array in the rear of the respective unit for activating at least one of said photo-responsive elements in each line scanner array with said touch screen area being substantially uniformly illuminated by a significant amount of ambient light when a pointer is brought near to a point in said touch screen area causing a change in light intensity at said point as viewed by said first and second units along first and second lines of vision, respectively, to said point, and calculating means connected to the line scanner array of photo-responsive elements in each of said photosensor units for determining:

(a) the angle "A" between said first line of vision and a straight line of length "D" extending from near said first corner to near said second corner, (b) the angle "B" between said second line of vision and said straight line of length D, (c) the cotangent of angle A and the cotangent of angle B, (d) calculating the distance "Y" along a perpendicular line extending from said straight line to said point by dividing said length D by the sum of CtnA plus CtnB, and (e) calculating the distance "X" from said first corner to said perpendicular line of multiplying the value of Y times CtnA.

2. A touch screen system as claimed in claim 1, in which:
said calculating means normalizes in terms of the length D the value of said distance Y for determining the value of Y/D,
said calculating means normalizes in terms of the length D the value of said horizontal distance X for determining the value of X/D, and
said calculating means provides output signals representative of the values of Y/D and X/D, said output signals being adapted for feeding to a computer.

3. A touch screen system as claimed in claim 2, in which:
said touch screen area is rectangular,
said touch screen is substantially uniformly illuminated by a significant amount of ambient light,
said wide angle viewing lens assembly in each of said photosensor units transmits ambient light from said touch screen area onto said line scanner array in the respective unit, and
such transmitted ambient light spans the whole of said rectangular touch screen area.

4. A touch screen system as claimed in claim 1, in which:
said touch screen area is immediately adjacent to a durable passive panel,
said panel is planar and is larger in extent than said touch screen area,
said touch screen area is substantially uniformly illuminated by a significant amount of ambient light, and
said first and second photosensor units are mounted upon said planar panel on portions of said panel extending outside of said touch screen area.

5. A touch screen system as claimed in claim 1, in which:
said touch screen area is immediately adjacent to a durable passive panel,
said panel has a dull reflectance for ambient light,
said panel is planar and is larger in extent than said touch screen area,
said first and second photosensor units are mounted on portions of said planar panel extending outside of said touch screen area,
said touch screen area is substantially uniformly illuminated by ambient light,
said panel is oriented away from horizontal,
said straight line of length "D" is horizontal, and
said first and second photosensor units are mounted facing downwardly toward said touch screen area.

6. A touch screen system as claimed in claim 2, in which:
said straight line of length D extending from near said first corner to near said second corner is a boundary of said touch screen area extending between said first and second corners,
said touch screen area is rectangular and is in the air, and
said boundary is one of the two longer sides of said rectangular touch screen area.

7. A touch screen system as claimed in claim 6, in which:
the usable area of said rectangular touch screen area is defined by a line parallel to said boundary,
said parallel line is spaced from said boundary and is located within said touch screen area, and
said usable area lies on the opposite side of said parallel line from said boundary.

8. A touch screen system as claimed in claim 1, in which:
said touch screen area is substantially uniformly illuminated and has a straight boundary line extending from said first corner to said second corner,
said straight boundary line has the same length as said straight line of length "D",
said straight line of length "D" is a line parallel to said boundary line and offset from said boundary line by a predetermined distance "E" in a direction away from said touch screen area,
the ends of said straight line of length "D" are aligned with said respective first and second corners, and
the distance "Y" from said straight boundary line to said point along a line perpendicular to said boundary line is calculated by the formula:

$$Y = \frac{D}{CtnA + CtnB} - E.$$

9. A touch screen system as claimed in claim 1, in which:
each of said photosensor units is symmetrical about a centerline, and
each unit is mounted with its centerline bisecting the included angle between the two lines of viewing which span said touch screen area as seen from the respective photosensor unit.

10. A touch screen system as claimed in claim 3, in which:
each of said first and second photosensor units is symmetrical about a centerline, and
the wide angle viewing lens assembly of each of said units is aimed toward said touch screen area in the direction causing said centerline of the respective unit to bisect the included angle between the two viewing lines from the respective unit which span the touch screen area.

11. A touch screen system as claimed in claim 10, in which:
the line scanner array in the rear of each of said photosensor units is oriented at an acute angle in the range from about 45° to 30° with respect to said straight line of length "D".

12. Touch screen apparatus comprising:
a pair of photosensor units adapted to be mounted proximate to but outside of a pair of successive corners of a passive touch screen area substantially uniformly significantly illuminated by ambient light,
each of said photosensor units having a front and a rear,
each of said units including mounting means for mounting the respective unit stationary with the front of the unit facing toward said touch screen area,
a light scanner array of closely spaced photo-responsive elements in the rear of each of said units,
a wide angle viewing lens assembly in the front of each of said units intended to face toward said touch screen area, and
each of said wide angle viewing lens assemblies being adapted for transmitting light from a lateral field of vision spanning said touch screen area and with limited height above said touch screen area onto the line scanner array in the rear of the respective unit for activating at least one of said photo-sensitive elements when a pointer is brought near to any point of said touch screen area substantially uniformly significantly illuminated by ambient light.

13. Touch screen apparatus as claimed in claim 12, in which:
said wide angle viewing lens assembly in each of said photosensor units has a lateral field of vision of about 90° C.

14. Touch screen apparatus as claimed in claim 12, in which:
said mounting means is readily demountable for enabling convenient transfer of said photosensor units to other mounting locations for use with other passive touch screen areas substantially uniformly illuminated by ambient light.

15. The method for converting a two-dimensional rectangular area into a touch screen comprising the steps of:
preselecting a conveniently located rectangular area being substantially uniformly illuminated by ambient light,
said rectangular area being defined by successive first, second, third and fourth boundaries,
positioning a first line scanner array of closely spaced photo-responsive elements proximate to but outside of a first corner of said rectangular area, said first corner being at the junction of said first and second boundaries,
facing said first line array of photosensors toward said rectangular area,
orienting said first line array of photosensors generally perpendicular to a first straight line about bisecting the included angle of said first corner,
focusing light from a field of vision spanning between the whole of said first and second boundaries with limited height away from said area onto said first line scanner array of photo-responsive elements,
positioning a second line scanner array of closely spaced photo-responsive elements proximate to but outside of a second corner of said rectangular area, said second corner being at the junction of said second and third boundaries,
facing said second line array of photosensors toward said rectangular area,
orienting said second line array of photosensors generally perpendicular to a second straight line about bisecting the included angle of said second corner,
focusing light from a field of vision spanning between the whole of said second and third boundaries with limited height away from said area onto said second line scanner array of photo-responsive elements,
using said first array for determining the angle "A" of the direction from said first array to a change in light intensity level at a point within said rectangular area caused by a pointer oriented generally perpendicular to said two-dimensional rectangular area and brought near to said point, said angle "A" being determined relative to said second boundary,
using said second array for determining the angle "B" of the direction from said second array to a change in light intensity level at said point, said angle "B" being determined relative to said second boundary,
calculating the cotangent of angle A relative to said second boundary,
calculating the cotangent of angle B relative to said second boundary,
calculating the perpendicular distance "Y" from said second boundary to said point by using the quotient of the length "D" along said second boundary between said first and second corners divided by the sum of the cotangent of angle A and the cotangent of angle B, and
calculating the perpendicular distance "X" from said first boundary to said point by multiplying the value of Y times the cotangent of angle A,
thereby employing ambient light for converting a two-dimensional rectangular area into a touch screen for determining the X and Y coordinates of any point within said area to which is brought a pointer oriented generally perpendicular to said area.

16. The method of converting a two-dimensional rectangular area into a touch screen as claimed in claim 15, including the steps of:
determining whether a pointer is actually present near said two-dimensional area and determining the center of gravity of the change in light intensity as viewed from said first and second arrays by performing the steps represented by the flow diagrams of FIGS. 10 and 11.

17. The method of converting a two-dimensional rectangular area into a touch screen as claimed in claim 15, including the steps of:
preselecting said conveniently located rectangular area substantially uniformly illuminated by ambient light with its plane oriented at an angle to horizontal and with the two longer boundaries of said rectangular area oriented horizontally and with one of said longer boundaries being at a higher elevation than the other,
positioning said first and second line scanner arrays near opposite ends of said higher longer boundary, and
facing said arrays downwardly toward said rectangular area.

18. The method of converting a two-dimensional rectangular area into a touch screen as claimed in claim 15, wherein:
the length of each of said line scanner arrays is oriented at an acute angle relative to a nearby boundary of said rectangular area, and
said acute angle being in the range from about 45° to 30°.

19. A touch screen system as claimed in claim 2, in which:
said calculating means determines whether or not a pointer is actually present in said touch screen area and determines the center of gravity of said pointer by the steps of:
converting the sensed values to logarithms;
calculating the overall average value of sensed values;
calculating moment zero (M0) using only the significant sensed values differing significantly from said overall average value;
calculating the first and second mathematical moments (M1 and M2) of only said significant sensed values;
re-calculating overall average values and comparing with prior calculations of overall average values for smoothing the data for optimizing calculations of moment zero (M0) and of said first and second mathematical moments (M1 and M2);

making a "NO" determination if the weight of the zero moment (M0) is less than a predetermined minimum;

calculating mathematical center of gravity (CG) of the significant sensed values by dividing said first mathematical moment (M1) by moment zero (M0);

calculating the square of the radius of gyration of said significant sensed values by dividing said second mathematical moment (M2) by moment zero (M0) and then subtracting the square of said center of gravity ($CG^2$); and determining that a pointer is present in said touch screen area is said radius of gyration is less than a predetermined reasonable maximum thereof (rmax).

20. A touch screen system comprising:

at least a first and a second photosensor unit;

each of said photosensor units having a front and a rear;

means for mounting said photosensor units proximate to but outside of at least first and second corners, respectively, of a touch screen area with said front of the respective photosensor unit facing toward said touch screen area and with said photosensor units being spaced apart by a convenient distance "D" and with said photosensor units being located near opposite ends of a straight line extending between said first and second corners;

each of said photosensor units having a line scanner array of closely spaced photoresponsive elements in the rear thereof;

each of said photosensor units having wide angle viewing lens means in the front thereof having a lateral field of viewing spanning said touch screen area for transmiting light from said touch screen area onto said line scanner array in the rear thereof;

said touch screen area being substantially uniformly illuminated by a significant amount of ambient light;

calculating means connected to said line scanner array of photoresponsive elements in each of said first and second photosensor units;

said calculating means including data input means for initial input of the size of said convenient distance "D"; and said calculating means being adapted for using trigonometric relationships related to the size of said convenient distance "D" and related to said straight line for calculating coordinates "X" and "Y" of a point in said touch screen area near to which is brought a pointer causing a change in light intensity at said point.

21. A touch screen system as claimed in claim 20, further comprising:

a third photosensor unit having a front and a rear;

means for mounting said third photosensor unit proximate to but outside of a third corner of said touch screen area with said front of said third photosensor unit facing toward said touch screen area;

said third corner being diagonally opposite to said first corner;

said third photosensor unit being spaced apart from said second photosensor unit by a second convenient distance and being located near opposite ends of a second straight line extending between said second and third corners;

said third photosensor unit having a line scanner array of closely spaced photoresponsive elements in the rear thereof;

said third photosensor unit having wide angle viewing lens means in the front thereof having a lateral field of view spanning said touch screen area for transmitting light from said touch screen area onto said light scanner array in the rear thereof;

said calculating means being connected to said line scanner array of photoresponsive elements in said third photosensor unit;

said data input means being adapted for inputting said second convenient distance; and said calculating means being adapted for using trignometric relationships related to the size of said second convenient distance and related to said second straight line for calculating coordinates "Y and "X2" of said point, wherein "X2" equals the size of said first convenient distance "D" minus coordinate "X", for optimizing calculations of coordinates "X" and "Y".

* * * * *